Dec. 8, 1970 M. J. MYLES ET AL 3,545,038
CONSTANT PRESSURE FILLING APPARATUS
Original Filed Oct. 31, 1966 2 Sheets-Sheet 1

INVENTORS.
MICHAEL J. MYLES
VYTAUTAS KUPCIKEVICIUS
JOHN P. SPELLMAN
ATTORNEY

United States Patent Office 3,545,038
Patented Dec. 8, 1970

3,545,038
CONSTANT PRESSURE FILLING APPARATUS
Michael J. Myles, Downers Grove, Vytautas Kupcikevicius, Chicago, and John P. Spellman, Oak Lawn, Ill., assignors to Union Carbide Corporation, a corporation of New York
Original application Oct. 31, 1966, Ser. No. 590,566, now Patent No. 3,451,098, dated June 24, 1969. Divided and this application Feb. 19, 1969, Ser. No. 816,857
Int. Cl. A22c 11/00
U.S. Cl. 17—49                     3 Claims

ABSTRACT OF THE DISCLOSURE

Food products having dimensional uniformity are prepared by a procedure wherein a food casing is automatically stuffed with a food emulsion which includes the steps of (a) admitting food emulsion under pressure into a food casing sheathed about and fully extended along the length of a stuffing means the food casing having a forwards closed end abutting the outlet end of the stuffing means and tensioning and restraining means attached to the open end of the casing sheathed about the stuffing means; (b) controlling the internal stuffing pressure of the food casing and progressive expansion of the stuffed portion of the food casing by the tensioning and restraining means attached to the open end of the food casing; (c) venting air from inside said food casing as it is being stuffed; (d) preventing food emulsion from backing up onto the outer surface of the stuffing means after the food casing has been stuffed; and (e) removing the stuffed food casing from the stuffing means and closing the open end of the stuffed food casing.

---

This application is a division of application Ser. No. 590,566, filed Oct. 31, 1966, now U.S. Pat. 3,451,098 issued June 24, 1969.

The present invention relates to an apparatus and method for filling food casings with food emulsions. More particularly, the present invention relates to an apparatus and method for filling said food casings automatically under a constant, controlled stuffing pressure.

The term "food casing," as used throughout this specification and in the appended claims, should be understood and is intended to refer to those food casings conventionally employed by those skilled in the art to commercially produce food products such as salami and bologna sausages, spiced meat loaves, cooked and smoked ham butts and the like.

In accordance with present, commercial practices, these food casings are manufactured in tubular form by extrusion and are further processed in drying equipment wherein they are diametrically sized to very narrow tolerances. Subsequently, the dried food casings are flattened and wound up on reels from which specific lengths are later cut to fulfill the needs and requirements of various meat packers to whom they are supplied. An example of the methods commercially employed to provide food casings in this manner is set forth in the U.S. patent to Hewitt (1,967,773).

Generally, these food casings are manufactured in flat widths which can range in size from between about 2" to 15" with the median range of flat widths measuring from between about 3" to 8". The food casings in the median range of flat widths are generally more commonly utilized by the meat packer. After cooking and/or curing the food item encased therein in accordance with conventional manufacturing processes, many of the food products obtained are sliced and packaged into units of predetermined weight for sale to the consumer. The slicing equipment employed in such packaging operations are pre-set to yield a specific weight-by-slice count for use in obtaining unit packages of equal weights. It is important, therefore, that the diameter and the incremental volume of an encased food product stuffed and processed in a food casing of a particular size be uniform from end to end and from one encased food product to the next.

As the food items encased in these food casings are cooked and/or cured, the food casings act as molds or containers so that the thusly processed food product obtained will exhibit dimensional uniformity. Generally, a food item is stuffed in a food casing under pressure in an emulsion or semi-emulsion state. Hence, the food casing must be capable of maintaining the food item stuffed therein in a desired or required shape during processing so that the food item can coagulate, cure or firm up as it is cooked and/or cured. During processing, the stuffed food items usually shrink and it is important that the food casing also be capable of shrinking proportionately with the food item so that the food products obtained exhibit desired or required surface texture and are dimensionally uniform from end to end and from one food product to the next.

Prior to stuffing, these food casings are typically prepared for stuffing by closing one end thereof and then soaking the thusly closed food casings in water maintained at a temperature of from between about 100° F. to 120° F. for a period of between about 20–30 minutes. This preparation acts to soften the food casings and thereby increase their pliability and enhance their workability. This also permits the food casings to be stuffed up to the recommended stuffed diameter of the particular sized food casing employed. After the food casings have been properly prepared, they are individually sheathed on a conventional stuffing tube which is connected, by means of a manually controlled valve, to a food emulsion source. A typical method employed to stuff food casings with a food emulsion is described in the U.S. patents to Shiner and Brounstein (2,999,756) and Cieri (3,091,799).

The methods and apparatus heretofore employed to stuff these food casings have generally relied upon the manual skill of the operator in controlling the stuffing of the food emulsion in the food casing. Since such factors as the manual skill, the fatigue level and physical dexterity of an operator vary from one stuffing operation to another as well as between different operators, encased food products are obtained whose dimensions vary significantly from end to end and from one encased food product to the next. These dimensional variations are also evident when these encased food products are subsequently sliced for packaging giving rise to underweight or overweight packages that are excessively costly and, therefor, not acceptable to the food packager.

Exemplary of the methods generally employed to stuff these food casings is one wherein the operator regulates the flow of food emulsion by manipulating a stuffing valve with one hand while restraining the expanding food casing in its progressive removal from the stuffing tube by gripping it with the other hand until the casing is filled from end to end. Stuffing pressure is maintained in the casing by the gripping hand of the operator. The last filled end is then closed by conventional clip closing means or tying apparatus.

This and similar stuffing methods prevent an operator from applying a constant and uniform stuffing pressure and/or restraining force during the stuffing of successive food casings. When higher stuffing speeds are used, the result of operator inefficiency becomes even more pronounced and is reflected in the varying dimensions of the encased products obtained. Consequently, the narrow dimensional tolerances built into the food casings during their manufacture are lost.

Since the encased food products obtained from these stuffing methods are generally not dimensionally uniform, a great deal of product waste is experienced by the food packager who subsequently slices the finished food products for packaging in unit packages of predetermined, uniform weight.

It has now been found that dimensional uniformity of these encased food products can be substantially improved by more closely controlling the stuffing pressure employed and simultaneously controlling the expansion of the food casing as it is being stuffed.

It is an object of the present invention, therefore, to provide a stuffing apparatus which is capable of automatically controlling the stuffing pressure exerted by a food emulsion as it is stuffed in a food casing.

Another object is to provide an apparatus which will automatically produce encased food products having a substantially uniform incremental volume and uniform dimensions from end to end and from a given product piece to a given product piece and a method therefor.

These and other objects of the present invention will become more apparent from the following discussion.

It has been found that the objects of the present invention can be generally obtained by providing, in combination, a stuffing tube equipped with a conventional stuffing valve at one end and having means at the other end for automatically sheathing a food casing about and along the length of said stuffing tube; means for automatically controlling the stuffing pressure of the food emulsion in the food casing; means for controlling the expansion of the food casing as it is being stuffed; means for preventing food emulsion from backing up onto and collecting on the outside of the stuffing tube; means for exhausting the air from inside the food casing as it is being stuffed; and means for supporting the thusly stuffed food casing.

The apparatus and method of the present invention will become apparent from the following description thereof when considered together with the accompanying drawing which is set forth as being exemplary of one embodiment of the present invention and is not intended, in any way, to be limitative thereof and wherein.

Figure 1:
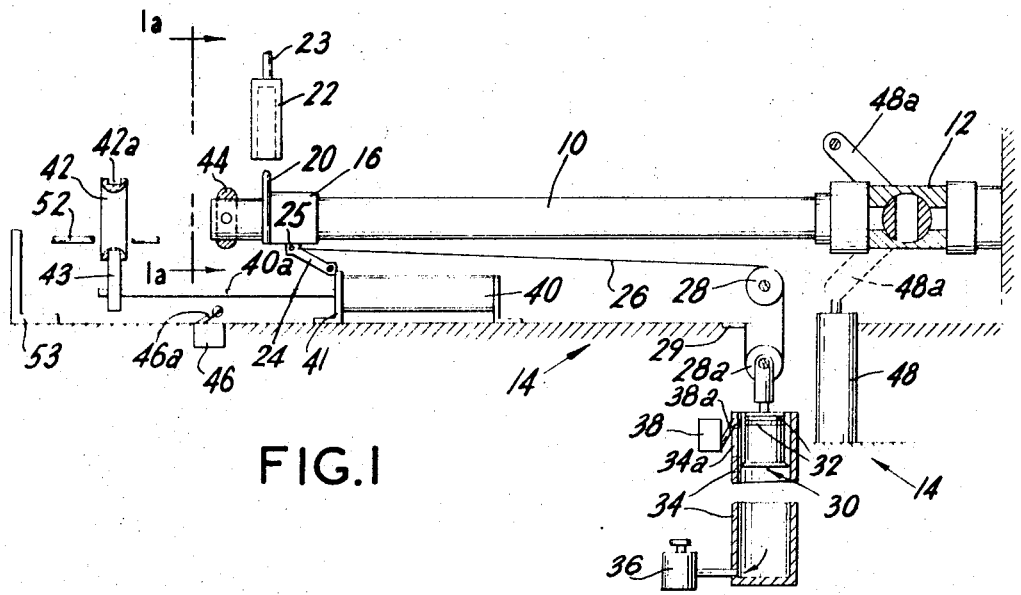
FIG. 1 is a side elevational view, part in section and part in phantom, illustrating one embodiment of the stuffing apparatus of the present invention.
Figure 4:
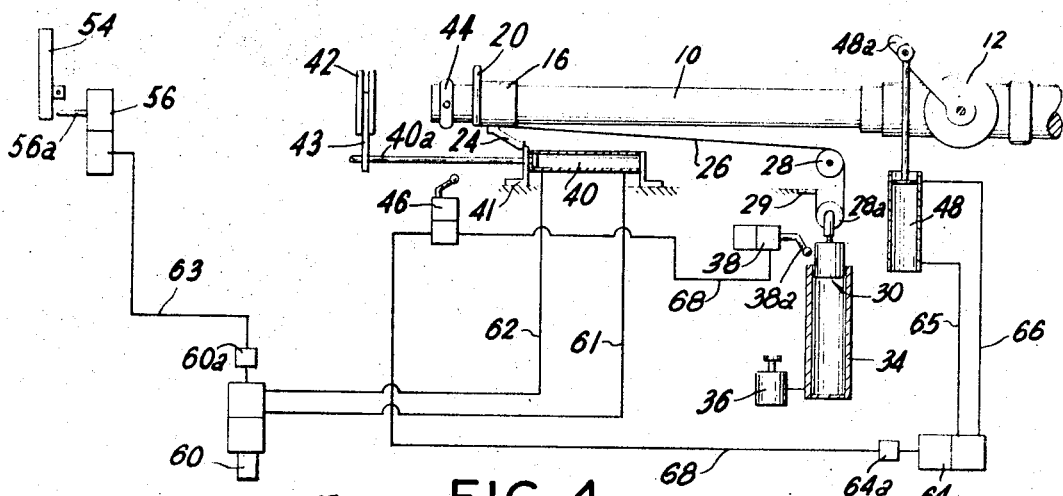
Figure 5:
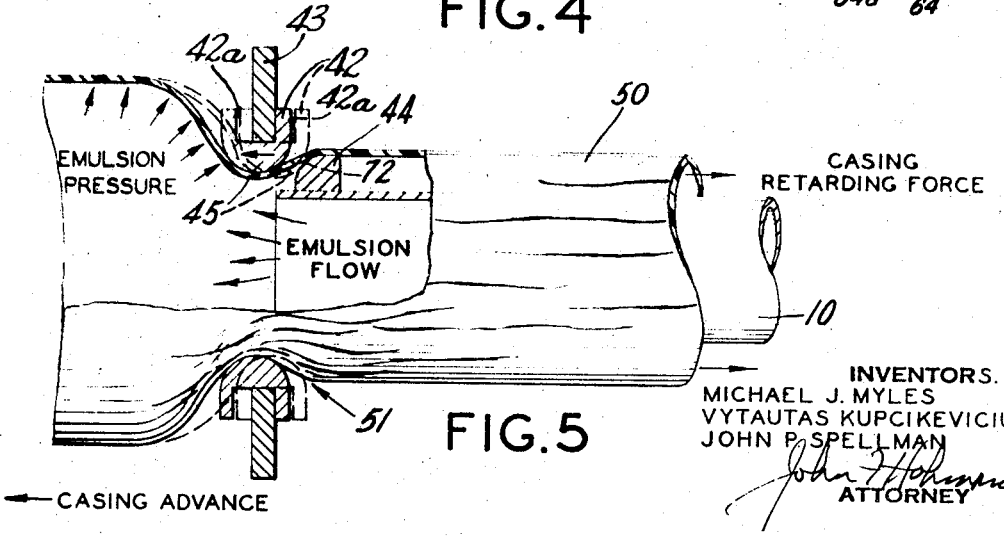

FIG. 4 is a schematic illustration showing the apparatus of FIG. 1 together with various means that can be employed to control and regulate the apparatus of the present invention; and, FIG. 5 is an exaggerated side elevational view, part in section, part in phantom and part broken away, depicting the various forces exerted and applied by different components of the apparatus during and after the stuffing of a food casing.

Figure 1A:
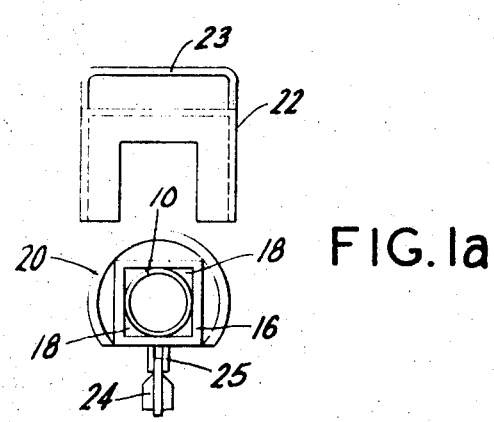
FIG. 1a is a sectional view thereof taken through line 1a—1a of FIG. 1.

Turning now to the drawing, wherein like reference numerals denote like parts, there is shown in FIG. 1 a stuffing tube 10 threadably secured at its input end to the output end of a stuffing valve 12 which, in turn, is secured to a suitable support means, generally designated by reference numeral 14. The input end of stuffing valve 12 is flexibly connected to a conventional food emulsion delivery source (not shown). Slideably mounted adjacent the output end of stuffing tube 10 is a tubular sliding member 16 fabricated in the form of a square or rectangle. Four openings 18 are formed and defined between the tangential points of contact of the outer circumference of the stuffing tube 10 with the inner surface of the sliding member 16 when sliding member 16 is mounted on stuffing tube 10 (FIG. 1a). These openings 18 provide the means through which air in the food casing is vented therefrom as the food casing is being stuffed.

As shown in FIGS. 1 and 1a, a wire ring 20 is formed about three sides of the outer surface of sliding member 16 and is secured to sliding member 16 at their tangential points of contact. Wire ring 20 is mounted thereon to act as a tongue member with a grooved, U-shaped casing gripping clip 22. Clip 22 has an integral handle 23 for manually engaging clip 22 on and securing it to wire ring 20. To the under side of sliding member 16 is a latch member 24 pivotally mounted thereto by pin 25 and positioned to engage the flange 41 of a pneumatic cylinder 40. Pneumatic cylinder 40 is mounted to frame 14 and positioned adjacent the free end of latch member 24 and a stoppering yoke 43 is secured to the end of the piston end 40a of cylinder 40. The sliding member 16, ring 20 and clip 22 comprise the casing gripping means of the apparatus.

One end of a flexible cable 26 is secured to latch member 24 intermediate its ends while the other end of flexible cable 26 is first trained about a fixedly mounted pulley 28, thence about a moveable pulley 28a, and is finally fixedly secured to the support frame 14 by conventional bracket means 29.

Suspended from moveable pulley 28a is a free-hanging weight, generally designated by reference numeral 30, which can be comprised of a single, unit weight or a plurality of individual weights 32 of equal or different weight. Free-hanging weight 30 is suspended from moveable pulley 28a so that it rides in and is guided by a cylinder 34 during vertical displacement of free-hanging weight 30 in cylinder 34. Cylinder 34 acts as a dashpot for weight 30 and is independently supported by conventional means (not shown). Connected to the lower end of cylinder 34, is a control valve 36 which permits air to be freely admitted into cylinder 34 when weight 30 is elevated and which provides restrictive means when weight 30 is descending into cylinder 34. Positioned adjacent the upper end of cylinder 34 is a shut off valve 38 which is connected to co-act with an interlock valve 46 and a 4-way stuffing valve 64 (FIG. 4) to control stuffing valve 12. Shut off valve 38 is independently mounted by conventional means (not shown) and is equipped with a cam arm 38a which is positioned to extend into the path of travel of weight 30 through slot 34a in the upper portion of cylinder 34.

As shown in greater detail in FIG. 5, an emulsion restraining ring 42 having an annular groove 42a defined in its outer circumference, is loosely mounted in yoke 43 and slideably secured therein by annular groove 42a. Mounted in this way, restraining ring 42 is capable of axial and radial movement with respect to stoppering yoke 43. Emulsion restraining ring 42 has a convex inner circumference 45 and is positioned such that its diameter and toroidal radius is capable of co-acting with the outer surface of a tubular collar 44 which is fixedly mounted adjacent the outlet end of stuffing tube 10. To accomplish this co-action, restraining ring 42 is positioned in a spaced-apart relationship adjacent tubular collar 44.

When properly positioned, the spaced-apart relationship between restraining ring 42 and tubular collar 44 is such that the closest distance between them is sufficient to permit passage of the casing 50 therebetween without exerting any force on the casing 50 as it is being stuffed. However, spaced-apart relationship between restraining ring 42 and tubular collar 44 should not be of such a distance as to prevent or interfere with the subsequent desired co-action of these members after the casing 50 has been stuffed, as is described in greater detail hereinbelow. Proper positioning of restraining ring 42 in spaced-apart relationship with respect to tubular collar 44 will depend, in part, upon the thickness of the casing wall, stuffing speed and the stuffing pressure of the food emulsion as it is stuffed in the casing and the like, and can be readily ascertained by those skilled in the art.

The inside diameter of restraining ring 42 is fabricated to be less than the outside diameter of a food casing to be stuffed. The outside circumference of tubular collar 44 is also convex and is fabricated to have a diameter no greater than the inside diameter of a food casing to be stuffed.

Figure 3:
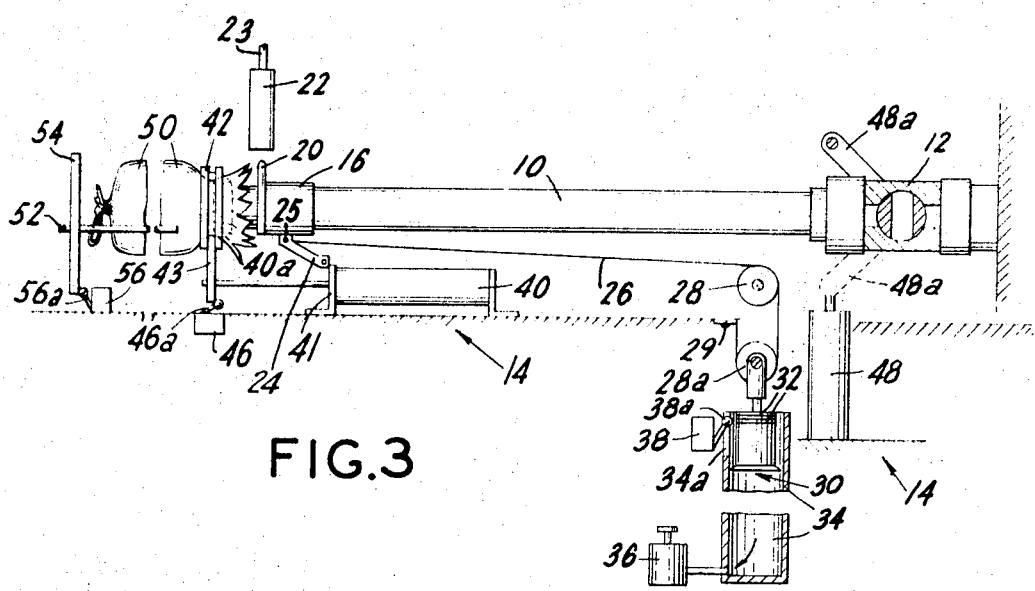

Mounted on frame 14 below and adjacent tubular collar 44 is an interlock valve 46 which is equipped with a pivotally mounted arm 46a. Interlock valve 46 is positioned so that its arm 46a is depressed by yoke 43 when emulsion restraining ring 42 is moved into operating position. (FIGS. 3 and 5.) A stuffing valve operating cylinder 48 is mounted on frame 14 adjacent stuffing valve 12 and is connected thereto by means of a pivotally mounted connecting link 48a.

Figure 2:
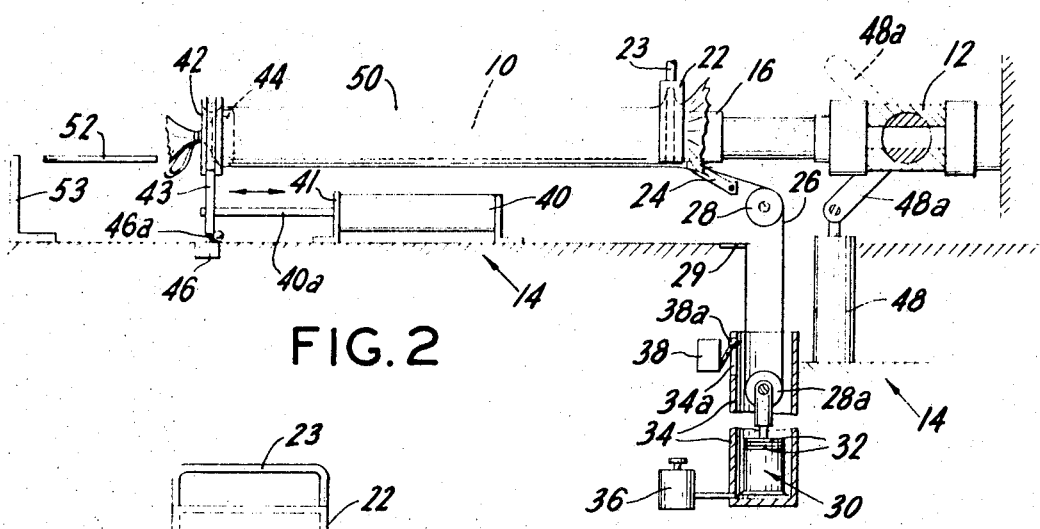
FIGS. 2 and 3 are side elevational views, part in section, part broken away and part in phantom, illustrating sequential operating positions of the components of the apparatus.

In FIG. 2, the various components of the stuffing apparatus of FIG. 1 are depicted in their relative operating positions after a food casing 50 has been sheathed about and extended along stuffing tube 10 in preparation to being stuffed with a food emulsion.

FIG. 3 illustrates the relative positions of the various components of the stuffing apparatus after a food casing 50 has been stuffed with a food emulsion. The stuffed portion of a food casing is supported in a generally horizontal position by means of a pair of parallel support rods 52 which are extended from and secured to a support bracket 53 mounted to frame 14 (FIG. 1). A bumper plate 54 is secured between support rods 52 intermediate the ends of support rods 52 and is positioned to contact a pivotally mounted lever arm 56a through which a return valve 56 is activated.

In FIG. 4 there is illustrated one embodiment of a pneumatic actuating means which can be employed to energize the various components of the stuffing apparatus of the present invention. As shown in FIG. 4, a four-way, manually operated and piloted air initiating valve 60 can be employed to set the various components of the apparatus into operating position prior to start up. Air lines 61, 62 connect initiating valve 60 to the blind end and piston rod end, respectively, of cylinder 40. A third air line 63 connects return valve 56 to initiating valve 60 through pilot end 60a of initiating valve 60.

A second four-way stuffing cock valve 64, equipped with pilot air control 64a, is connected by means of air lines 65, 66 to the blind end and piston rod end, respectively, of stuffing valve operating cylinder 48. Valve 64 is also connected, through its pilot air control 64a, to interlock valve 46 and shut-off valve 38 by means of air line 68.

A typical operation of the stuffing apparatus of the present invention will now be described and can be more fully understood when taken together with the accompanying drawing.

Before start-up of the stuffing apparatus, the open end of a pre-tied, pre-soaked food casing 50 is placed over the sliding member 16 and the wire ring 20 so that the open end of the food casing 50 extends beyond the wire ring 20 and the sliding member 16 a distance of between about 2" to 4". The groove in casing gripping clip 22 is then clamped over the food casing 50 and the wire ring 20 firmly securing the food casing 50 therebetween. While these operations are performed manually, it will become apparent to those skilled in the art that the same can be accomplished in whole or in part through conventional, automatic means. Next, the sliding member 16 is rotated so that latch 24 is disengaged from flange 41 at the piston end of cylinder 40. This permits weight 30 to be lowered into cylinder 34. Weight 30 can be controlled in its descent by use of control valve 36. In this way, weight 30, acting through flexible cable 26, latch 24, sliding member 16 and gripping clip 22, causes the food casing 50 to be drawn over tubular collar 44 and extended along and sheathed about the stuffing tube 10 until the pre-tied, closed end of the food casing 50 is abutted against the outlet end of the stuffing tube 10.

The four-way initiating valve 60 (FIG. 4) is now opened, activating cylinder 40 through air line 62 thus advancing yoke 43 and restraining ring 42 to a predetermined stroke limit of cylinder 40. In this manner restraining ring 42 is positioned in spaced-apart relationship with respect to tubular collar 44 to define a spaced, annular nip 72 therebetween (FIG. 5). These adjustments and the positioning of restraining ring 42 and tubular collar 44 act to indent and gather the wall and the folds and creases of food casing 50 narrowing it down and about the curved surface of tubular collar 44 and into the defined annular nip 72. (FIG. 5.) The creases and folds thusly formed in the food casing 50 are generally indicated in FIG. 5 by reference numeral 51.

As restraining ring 42 reaches its advanced position, the lower, extending portion of yoke 43 contacts and depresses lever arm 46a thereby actuating interlock valve 46. Interlock valve 46, in turn, actuates four-way stuffing cock valve 64 through pilot air line 68 (FIG. 4) thereby energizing the stuffing cock operating cylinder which opens the stuffing cock 12 by lowering the pivotally mounted connecting link 48a. Thereupon, food emulsoin is permitted to flow through the stuffing tube and into the food casing 50.

As the food emulsion enters the food casing 50 and contacts its pre-tied, closed end, the casing tensioning and retarding means comprising weight 30, flexible cable 26, sliding member 16 and latch 24, acts to retard and restrain the advance of the pre-tied, closed end of the food casing 50. This retarding effect, created by weight 30, urges the pre-tied, closed end of the food casing 50 against the outlet end of stuffing tube 10 until the food emulsion entering the food casing builds up sufficient pressure, acting horizontally on the closed end of the food casing 50, to overcome the opposite, retarding force created by weight 30. When the horizontal force created by the filling pressure of the food emulsion becomes greater than the opposing, retarding force created by weight 30, the closed end of the food casing 50 will begin to advance horizontally and freely slide through the formed annular nip 72 toward the parallel support rods 52 (FIGS. 1, 2, and 3). At the same time, the internal pressure created by the food emulsion entering the food casing causes the food casing 50 to pass through restraining ring 42 after it has freely passed through the formed annular nip 72. In this manner, the stuffed food casing 50 is simultaneously expanded radially and along its length to its recommended stuffed diameter and the food emulsion is stuffed therein to obtain a uniform incremental volume throughout the length of the food casing.

The force exerted by air cylinder 40 on restraining ring 42 maintains the defined spaced annular nip 72 relatively constant against the snubbing strains created therewithin as the wall of the food casing 50 is permitted to freely advance past annular surface 42. At this point, only the frictional forces created by the wall of the casing 50 as it passes over the curved outer surface of tubular ring 44 and the inner circumferential surface 45 of restraining ring 42 are exerted on the wall of the food casing 50 (FIG. 5).

Meanwhile, the retarding force exerted by weight 30 on the closed end of the food casing 50, acts to regulate the internal pressure created by the food emulsion in the stuffed portion of the food casing 50 as it advances. By maintaining the retarding force exerted by weight 30 constant the stuffing pressure exerted by the food emulsion being stuffed in the food casing 50 will also be constant. In this manner, a food casing having uniform expansion characteristics can be filled along its length to result in a stuffed food casing that will have a uniform incremental volume throughout its length and be of uniform diameter from end to end and from one encased food product to the next within a given food casing size range.

The various forces acting on the food casing 50 as it is being stuffed are illustrated in FIG. 5.

As the stuffed portion of the food casing 50 expands and increases in length, it slides on and is supported by parallel support rods 52 (FIGS. 1, 2, and 3). When the desired length of the stuffed casing 50 has been obtained, as is determined by the pre-positioning of shut off valve 38 and the length of the food casing employed, weight 30 engages cam arm 38a of shut off valve 38 (FIG. 3). This actuates stuffing valve operating cylinder 48, through interlock valve 46 and pilot air line 68, connected to stuffing cock valve 64, to pressurize the blind end of cylinder 48 and evacuate the piston rod end of stuffing valve operating cylinder 48, through air line 66 and four-way stuffing cock valve 64, thereby raising connecting link 48a (FIG. 4). In this manner, the flow of food emulsion from stuffing valve 12 into the stuffing tube 10 and food casing 50 is halted as is the advance of the stuffed food casing 50. As the food casing 50 is halted, the emulsion pressure on that portion of the wall of the food casing 50 adjacent the spaced, annular nip 72 urges restraining ring 42 backwardly from yoke 43 along groove 42a toward tubular collar 44. This action decreases and tends to close the defined, spaced annular nip 72 so that the wall of the food casing 50 is impinged between tubular collar 44 and restraining ring 42 as shown in phantom in FIG. 5. This co-action between tubular collar 44 and restraining ring 42 serves to stopper the food casing 50 and prevent emulsion leakage or flow-back until a second closure is made in the stuffed food casing 50. At this point, sliding member 16 has been advanced so that latch 24 engages flange 41 at the piston end of cylinder 40 (FIG. 3). The casing gripping clamp 22 can now be disengaged from food casing 50 and wire ring 20 while the sliding member 16 is retained in its position adjacent the outlet end of stuffing tube 10.

The operator is now free to grip the food casing 50 about the outlet end of the stuffing tube 10 and remove the stuffed food casing from the stuffing tube. During removal of the stuffed casing, the operator must either firmly close the open end of the stuffed food casing to maintain the stuffed pressure and prevent any loss of food emulsion or employ commercial closure means such as conventional clipping or tying apparatus. Next, the operator slides the stuffed and closed food casing along the parallel support bars 52 away from the outlet end of the stuffing tube 10 until the pre-tied end of the food casing 50 contacts bumper plate 54 (FIG. 3). When bumper plate 54 is thus contacted, it, in turn, actuates return valve 56 when it engages lever arm 56a. Actuation of return valve 56, acting through pilot air line 63, resets four-way initiating valve 60 thereby permitting the emulsion restraining collar 42 to be retracted from its spaced-apart, coacting position adjacent tubular collar 44 clear of the outlet end of stuffing tube 10. The apparatus is now ready to begin another stuffing cycle.

While the present invention has been described with particularity, and in some detail, it should be understood that the same is susceptible of variations, modifications and alterations without departing from the scope and spirit of the invention.

What is claimed is:

1. A method for automatically stuffing a food casing with a food emulsion, including the steps of:
    (a) admitting a food emulsion under pressure into a food casing sheathed about and fully extended along the length of a stuffing means, said fully extended food casing having a forward closed end abutting the outlet end of said stuffing means and tensioning and restraining means secured to the open end of the casing sheathed about said stuffing means;
    (b) controlling the internal stuffing pressure of said food casing and the progressive expansion of the stuffed portion of said food casing as it is removed from the outlet end of said stuffing means by said tensioning and restraining means;
    (c) venting air from inside said food casings as it is being stuffed;
    (d) preventing food emulsion from backing up onto the outer surface of said stuffing means after said food casing has been stuffed;
    (e) removing the thusly stuffed food casing from the stuffing means; and
    (f) closing the open end of the thusly stuffed food casing.

2. The method of claim 1 wherein the food emulsion is prevented from backing up onto the outer surface of said stuffing means by impinging the expanded portion of the stuffed food casing between the circumferential surface of a restricting aperture and the circumferential surface of a collar adjacent thereto at the outlet end of said stuffing means.

3. The method of claim 1 wherein said tensioning and restraining means secured to the open end of said food casing is slideably mounted on said stuffing means.

References Cited

UNITED STATES PATENTS

| 658,521 | 9/1900 | Atkinson | 17—33 |
| 2,871,508 | 2/1959 | Hill | 17—41 |
| 2,999,270 | 9/1961 | Knapp | 17—35 |
| 3,317,950 | 5/1967 | Ziolko | 17—49 |

LUCIE H. LAUDENSLAGER, Primary Examiner

U.S. Cl. X.R.

17—35